(12) United States Patent
Tamashima et al.

(10) Patent No.: US 10,520,906 B2
(45) Date of Patent: Dec. 31, 2019

(54) MOTOR CONTROL SYSTEM, MOTOR CONTROL DEVICE, AND NON-TRANSITORY RECORDING MEDIUM

(71) Applicant: OMRON Corporation, Kyoto (JP)

(72) Inventors: Daisuke Tamashima, Ritto (JP); Fumiaki Sato, Kyoto (JP); Takao Ushiyama, Ritto (JP); Naoya Hashimoto, Moriyama (JP)

(73) Assignee: OMRON Corporation, Kyoto (JP)

( * ) Notice: Subject to any disclaimer, the term of this patent is extended or adjusted under 35 U.S.C. 154(b) by 62 days.

(21) Appl. No.: 15/752,253

(22) PCT Filed: Nov. 30, 2016

(86) PCT No.: PCT/JP2016/085579
§ 371 (c)(1),
(2) Date: Feb. 13, 2018

(87) PCT Pub. No.: WO2017/158944
PCT Pub. Date: Sep. 21, 2017

(65) Prior Publication Data
US 2019/0025783 A1    Jan. 24, 2019

(30) Foreign Application Priority Data
Mar. 14, 2016 (JP) .................. 2016-050163

(51) Int. Cl.
*G05B 19/042* (2006.01)
*G05B 19/414* (2006.01)
(Continued)

(52) U.S. Cl.
CPC ........... *G05B 19/042* (2013.01); *G05B 19/05* (2013.01); *G05B 19/414* (2013.01); *H02P 5/46* (2013.01); *G05B 2219/25368* (2013.01)

(58) Field of Classification Search
CPC ......... B60L 15/007; G05B 2219/45187; H02P 5/74; A61B 34/30; A61B 90/361
See application file for complete search history.

(56) References Cited

U.S. PATENT DOCUMENTS

| 5,391,970 A | 2/1995 | Chaffee et al. |
| 2007/0007926 A1 | 1/2007 | Iwashita et al. |

(Continued)

FOREIGN PATENT DOCUMENTS

| CN | 1590696 | 3/2005 |
| CN | 102227870 | 10/2011 |

(Continued)

OTHER PUBLICATIONS

"International Search Report (Form PCT/ISA/210)" of PCT/JP2016/085579, dated Feb. 14, 2017, with English translation thereof, pp. 1-4.

(Continued)

*Primary Examiner* — Bickey Dhakal
*Assistant Examiner* — Zoheb S Imtiaz
(74) *Attorney, Agent, or Firm* — JCIPRNET (57) ABSTRACT

The disclosure enables mutual relationships among operation statuses of each motor to be ascertained without using synchronous serial communication between multiple motor control devices. The motor control system is equipped with: a motor driver having a trigger determination part for determining whether or not a trigger condition is satisfied, a trigger notification part for transmitting a trigger notification indicating that the trigger condition is satisfied to motor drivers by asynchronous communication, and a trace result information generation part for causing a storage part to store a trigger data number for identifying operation data when the trigger condition is satisfied; and motor drivers each having a trace result information generation part for (Continued)

causing a storage part to store a slave trigger time at which the trigger notification is received, a trigger data number for identifying operation data corresponding to the slave trigger time, and a master trigger time.

12 Claims, 4 Drawing Sheets

(51) Int. Cl.
 *H02P 5/46* (2006.01)
 *G05B 19/05* (2006.01)

(56) References Cited

U.S. PATENT DOCUMENTS

| | | |
|---|---|---|
| 2007/0188116 A1 | 8/2007 | Aoyama et al. |
| 2014/0219698 A1* | 8/2014 | Ishizuka ............ G05B 19/0421 400/578 |
| 2016/0313727 A1* | 10/2016 | Chen .................. G05B 19/4185 |
| 2019/0013748 A1* | 1/2019 | Barrenscheen ........... H02P 6/10 |

FOREIGN PATENT DOCUMENTS

| | | |
|---|---|---|
| EP | 1659465 | 5/2006 |
| JP | H3-26130 | 2/1991 |
| JP | H4-96682 | 3/1992 |
| JP | 2004-248495 | 9/2004 |
| JP | 2008-176673 | 7/2008 |
| JP | 2010-283901 | 12/2010 |

OTHER PUBLICATIONS

"Written Opinion of the International Searching Authority (Form PCT/ISA/237)" of PCT/JP2016/085579, dated Feb. 14, 2017, with English translation thereof, pp. 1-6.

"Search Report of Europe Counterpart Application", dated Oct. 30, 2019, p. 1-p. 9.

"Office Action of China Counterpart Application," with English translation thereof, dated Nov. 5, 2019, p. 1-p. 11.

* cited by examiner

MOTOR CONTROL SYSTEM, MOTOR CONTROL DEVICE, AND NON-TRANSITORY RECORDING MEDIUM

CROSS-REFERENCE TO RELATED APPLICATION

This application is a 371 application of the international PCT application serial no. PCT/JP2016/085579, filed on Nov. 30, 2016, which claims the priority benefit of Japan application no. 2016-050163, filed on Mar. 14, 2016. The entirety of each of the abovementioned patent applications is hereby incorporated by reference herein and made a part of this specification.

TECHNICAL FIELD

The disclosure relates to a motor control system, a motor control device, and a non-transitory recording medium.

DESCRIPTION OF RELATED ART

In the related art, a motor control system that enables a plurality of motors to be controlled in a synchronized manner and enables operation statuses to be ascertained by synchronous serial communication is known.

For example, Patent literature 1 discloses a motor control system that connects a higher-level device with a plurality of motor control devices by a synchronous serial communication means. The motor control system described in Patent literature 1 provides instructions for starting and stopping saving of computation information via synchronous serial communication, reads the computation information saved in a storage means, and displays the computation information on an external device via asynchronous serial communication. This makes it possible to analyze mutual relationships among operation statuses of the plurality of motors in detail by ascertaining the operation statuses of the plurality of motors in the same period of time.

RELATED ART

Patent Literature

[Patent Literature 1] Japanese Patent Application Laid-Open No. 2008-176673 (Published on Jul. 31, 2008)

SUMMARY

Technical Problem

In the motor control system described in Patent literature 1, the instructions for starting and stopping the saving of the computation information are provided via synchronous serial communication. Therefore, it is not possible to ascertain the operation statuses of the plurality of motors in the same period of time if the higher-level device and the respective motor control devices are not in a state of performing cyclic communication. Here, the synchronous serial communication leads to a high processing load on hardware (a CPU), and also, the communication cycle of the synchronous serial communication becomes longer in proportion to the command sizes of instructions for predetermined processing (for example, the instruction for starting the saving of the computation information and the instruction for stopping the saving of the computation information). That is, the communication data frame size in the synchronous serial communication increases. In a case in which the method of ascertaining the operation statuses by synchronous serial communication is used as described above, the communication data frame size of the synchronous serial communication including the predetermined processing commands increases, and as a result, the processing load on the higher-level device and the motor control devices increases, and also, the communication cycle of the synchronous serial communication increases. Meanwhile, it is desirable that the communication cycle of the synchronous serial communication be shorter since the communication cycle directly affects performance of a device that is constructed using the motor control devices.

In addition, Patent literature 1 is directed to servo amplifiers as the motor control devices, and the operation statuses are ascertained using the synchronous serial communication for a plurality of servo amplifiers provided with synchronous serial communication means with the same performance. Therefore, the technique of Patent literature 1 is not assumed to be simply applied to a motor control system in which inverters and servos are provided together as the motor control devices.

As described above, Patent literature 1 has a variety of problems caused by performing the processing of starting and stopping the saving of the computation information on the plurality of motor control devices using the synchronous serial communication.

In view of the aforementioned, the disclosure realizes a motor control system that enables mutual relationships among operation statuses of motors corresponding to the respective motor control devices to be ascertained without using the synchronous serial communication for the plurality of motor control devices.

Solution to Problem

In order to solve the aforementioned problems, a motor control system according to the disclosure includes: a plurality of motors; and motor control devices that are connected to the motors respectively and control the motors at a predetermined control cycle, in which one of the motor control devices is a master device while other motor control devices are slave devices. (1) The master device includes a first storage device that stores operation data of the motor connected to the master device at a first predetermined time interval, a trigger determination part that determines whether or not the operation data satisfies a predetermined trigger condition, a trigger notification part that transmits a trigger notification that includes a master trigger time that is a time at which the trigger condition is satisfied to the slave devices by asynchronous communication when the trigger determination part determines that the trigger condition is satisfied, and a first result information generation part that causes the first storage device to store first specification information for specifying the operation data when the trigger condition is satisfied, and (2) each of the slave devices includes a second storage device that stores operation data of the motors connected to the slave devices at a second predetermined time interval, and a second result information generation part that causes the second storage device to store second specification information for specifying the operation data when the trigger notification is received, a slave trigger time that is a time at which the trigger notification is received, and the master trigger time that is included in the trigger notification when the trigger notification is received from the trigger notification part.

In addition, in order to solve the aforementioned problems, a motor control system according to the disclosure includes: a plurality of motors; and motor control devices that are connected to the motors respectively and control the motors at a predetermined control cycle, in which one of the motor control devices is a master device while other motor control devices are slave devices. (1) The master device includes a first storage device that stores operation data of the motor connected to the master device, a trigger determination part that determines whether or not a predetermined trigger condition is satisfied, a trigger notification part that transmits a trigger notification indicating that the trigger condition is satisfied to the slave devices by asynchronous communication when the trigger determination part determines that the trigger condition is satisfied, and a first result information generation part that causes the first storage device to store first specification information for specifying the operation data when the trigger condition is satisfied and a master trigger time that is a time at which the trigger condition is satisfied, and (2) each of the slave devices includes a second storage device that stores operation data of the motors connected to the slave devices, and a second result information generation part that causes the second storage device to store second specification information for specifying the operation data when the trigger notification is received and a slave trigger time that is a time at which the trigger notification is received when the trigger notification is received from the trigger notification part.

Effects

According to the disclosure, it is possible to realize the motor control system that enables mutual relationships of operation statuses of the motors corresponding to the respective motor control devices to be ascertained without using the synchronous serial communication for the plurality of motor control devices.

DESCRIPTION OF THE EMBODIMENTS

Hereinafter, an embodiment of the disclosure will be described in detail with reference to drawings.
[Configuration of Motor Control System 100]

Figure 1:
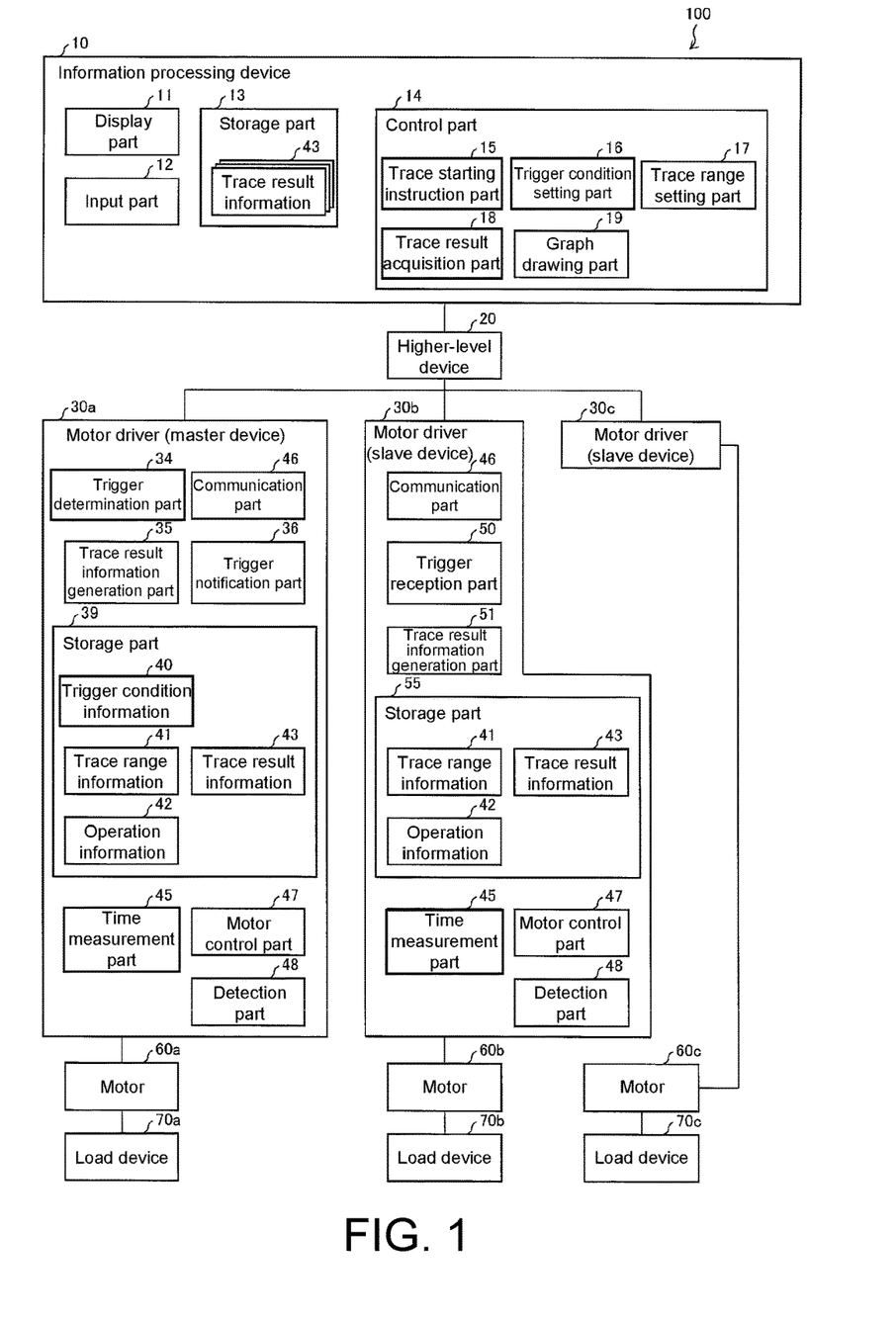
FIG. 1 is a block diagram illustrating a configuration outline of a motor control system according to an embodiment of the disclosure.

FIG. 1 is a block diagram illustrating a configuration outline of a motor control system 100 according to the embodiment.

The motor control system 100 includes an information processing device 10, a higher-level device 20, a plurality of motor drivers (motor control devices) 30 (30a, 30b, 30c), a plurality of motors 60 (60a, 60b, 60c), and a plurality of load devices 70 (70a, 70b, 70c).

The higher-level device 20 is a control device such as a programmable logic controller (PLC). The higher-level device 20 is connected to the information processing device 10, for example, via Ethernet (registered trademark) or the like. In addition, the higher-level device 20 is connected to the motor drivers 30 via EtherCAT (registered trademark) or the like, for example.

The higher-level device 20 transmits operation orders such as a speed order and a position order received from the information processing device 10 and operation orders such as a speed order and a position order generated inside the higher-level device 20 to the motor drivers 30. Values of the operation orders such as the speed order and the position order generated inside the higher-level device 20 are transmitted to the motor drivers 30 at a predetermined cycle.

The motor drivers 30 are connected to the higher-level device 20 with a cable, perform feedback control on the motors 60, and drive the load devices 70 based on the operation orders received from the higher-level device 20. The motor drivers 30 may be servo drivers or may be inverters. In addition, both the servo drivers and the inverters may be present together as the motor drivers 30.

The motor drivers 30 receive the operation orders from the higher-level device 20 at a predetermined communication cycle and control the corresponding motors as described above.

In the motor control system 100 according to the embodiment, the respective motor drivers 30 store operation data including ordered values transmitted to the corresponding motors 60 and actually measured values acquired from the motors 60 at a predetermined cycle and output the operation data to the information processing device 10 via the higher-level device 20. In this case, the information processing device 10 is configured to be able to acquire an operation data group in a desired period of time (trace range) from the respective motor drivers 30 without using synchronous serial communication between the higher-level device 20 and the respective motor drivers 30.

The configuration capable of acquiring the operation data group in the desired trace range from the respective motor drivers 30 without using the synchronous serial communication will be described hereinafter.

In the embodiment, in the processing of the information processing device 10 acquiring the operation data group, one of the plurality of motor drivers 30 is set as a master device that transmits orders related to the processing to the other motor drivers 30. In addition, the motor drivers 30 other than the master device, among the plurality of motor drivers 30, are set as slave devices that execute the processing of acquiring the operation data group in response to the orders transmitted from the master device. In the example illustrated in FIG. 1, the motor driver 30a is the master device while the motor driver 30b and the motor driver 30c are the slave devices.

[Configuration of Motor Driver 30a]

The motor driver 30a that is the master device includes a trigger determination part 34, a trace result information generation part (first result information generation part) 35, a trigger notification part 36, a storage part (first storage device) 39, a time measurement part 45, a communication part 46, a motor control part 47, and a detection part 48.

The storage part 39 stores trigger condition information 40, trace range information 41, operation information 42, and trace result information 43. Details of the information stored in the storage part 39 will be described later.

The time measurement part 45 measures a current time of the device itself.

The communication part 46 receives various orders from the higher-level device 20. The orders received by the communication part 46 include, for example, a command order that is an order indicating that a predetermined operation, called a trial operation, is to be performed and ordered values such as a speed and a position.

The motor control part 47 generates a motor drive signal (drive current) for driving the motor 60a in accordance with the ordered values such as the speed and the position received by the communication part 46 from the higher-level device 20 and outputs the motor drive signal to the motor 60a.

The detection part 48 acquires actually measured values such as the speed and the position of the motor 60a. If the detection part 48 receives a trace starting instruction from the information processing device 10, the detection part 48 stores operation data that includes the ordered values such as the speed and the position received from the higher-level device 20 and the actually measured values acquired from the motor 60a as the operation information 42 in the storage part 39 at a predetermined cycle (at a first predetermined time interval). The predetermined cycle (first predetermined time interval) may be the same as the control cycle or an integer multiple of the control cycle. In addition, the predetermined cycle may be a unique sampling cycle that is different from the control cycle.

The sampling cycle can be set by a user, for example, for the motor driver 30a via the information processing device 10. Moreover, the motor driver 30a may own the sampling cycle uniquely. Therefore, the operation information 42 that is stored in the storage part 39 includes operation data of a control cycle at which the motor driver 30 performs control on the motor 60a, a cycle that is an integer multiple of the control cycle, or the sampling cycle, instead of the operation data of a communication cycle (the communication cycle is typically longer than the aforementioned first predetermined time interval) at which the higher-level device 20 and the motor driver 30 perform communication.

The operation information 42 stored in the storage part 39 is in a ring buffer format, and in a case in which there is a predetermined number of pieces of operation data, the oldest operation data is overwritten by the latest operation data.

The trigger determination part 34 acquires the trigger condition information 40 that is stored in the storage part 39, compares the trigger condition indicated by the acquired trigger condition information 40 with the latest operation data of the operation information 42 of the motor 60a every time the operation information 42 is updated (that is, every time the latest operation data is stored (or overwritten) in the operation information 42 at the control cycle), and determines whether or not the trigger condition is satisfied.

When determining that the trigger condition is satisfied, the trigger determination part 34 transmits a determination result indicating that the trigger condition is satisfied to the trigger notification part 36 and the trace result information generation part 35.

The trigger condition is set based on the ordered values such as the speed and the torque of the motor 60a or the actually measured values, for example. If the trigger condition is set as "the ordered value of the speed of the motor 60a is equal to or greater than 10 rpm," for example, the trigger determination part 34 determines whether or not the ordered value of the speed of the motor 60a is equal to or greater than 10 rpm, and when the ordered value of the speed of the motor 60a is equal to or greater than 10 rpm, the trigger determination part 34 determines that the trigger condition is satisfied.

When the trigger determination part 34 determines that the trigger condition is satisfied, the trigger notification part 36 acquires a time at which the trigger condition is satisfied from the time measurement part 45, stores the acquired time as a master trigger time t1 in the storage part 39, and provides a notification that the trigger condition is satisfied to the trace result information generation part 35.

In addition, the trigger notification part 36 transmits the trigger notification indicating that the trigger condition is satisfied and including the master trigger time t1 to the motor drivers 30b and 30c that are the slave devices by asynchronous communication. Because of the asynchronous communication, the timing at which the trigger notification part 36 provides the trigger notification to the motor driver 30b and the timing at which the trigger notification part 36 provides the trigger notification to the motor driver 30c are different from each other. Therefore, the trigger notification part 36 may transmit the trigger notifications by using a service data object (SDO), for example, in the case of using EtherCAT (registered trademark) as a field network.

When the trigger determination part 34 determines that the trigger condition is satisfied, the trace result information generation part 35 refers to the trace range information 41 stored in the storage part 39.

The trace range information 41 is information that is set with reference to the master trigger time t1 and that indicates a predetermined period of time (trace range) during which the operation data is acquired. Specifically, the trace range information 41 is information that includes (1) a pre-trigger data number, which indicates the number of pieces of operation data before the master trigger time t1, and (2) a post-trigger data number, which indicates the number of pieces of operation data after the master trigger time t1.

The trace result information generation part 35 waits until the operation data is updated by the post-trigger data number after the master trigger time t1, and reads the operation data group (first operation data group) of the motor 60a in the trace range indicated by the referenced trace range information 41 from the operation information 42. Then, the trace result information generation part 35 associates and stores the read operation data group with the master trigger time t1 as the trace result information 43 in the storage part 39.

The operation data group is stored in a state that the operation data is arranged in the order in which the operation data has been generated. For example, the oldest operation data in the trace range is located at the first place, and other operation data is arranged with the older coming earlier. At this time, the trace result information generation part 35 causes a trigger data number (first specification information) indicating which of the operation data (records) is the operation data at the master trigger time t1 in the operation data group in the trace range to be included in the trace result information 43.

In addition, the trace result information 43 includes identification information indicating which of the motor drivers 30 the operation data of the operation data group belongs to and what operations of the motor 60 the operation data corresponds to. For example, the identification information is information indicating that the operation data is at least one of a position ordered value, a position measured value, a speed ordered value, a speed measured value, a torque ordered value, and a torque measured value.

Then, the trace result information generation part 35 reads the trace result information 43 stored in the storage part 39 and transmits the trace result information 43 to the information processing device 10 via the communication part 46 and the higher-level device 20.

[Configuration of Motor Drivers 30b and 30c]

The motor driver 30b that is a slave device has a trigger reception part 50, a trace result information generation part (second result information generation part) 51, a storage part (second storage device) 55, a time measurement part 45, a communication part 46, a motor control part 47, and a detection part 48. The motor driver 30c has the same configuration as the motor driver 30b and illustration of an inner configuration of the motor driver 30c is omitted in FIG. 1.

The time measurement part 45 measures a current time of the device itself.

The storage part 55 stores the trace range information 41, the operation information 42, and the trace result information 43.

The communication part 46 receives various orders from the higher-level device 20. The orders received by the communication part 46 include, for example, a command order that is an order indicating that a predetermined operation, called a trial operation, is to be performed and ordered values such as speeds and positions.

The motor control part 47 generates motor drive signals (drive current) for driving the motors (that is, the motors 60b and 60c) connected thereto in accordance with the ordered values such as the speeds and the positions received by the communication part 46 from the higher-level device 20 and outputs the motor drive signals to the motors 60b and 60c.

The detection part 48 acquires actually measured values such as the speeds and the positions of the motors 60b and 60c. If the detection part 48 receives a trace starting instruction from the information processing device 10, the detection part 48 stores the operation data including the ordered values such as the speeds and the positions received from the higher-level device 20 and the actually measured values acquired from the motors 60b and 60c as the operation information 42 in the storage part 55 at a predetermined cycle (at a second predetermined time interval). The predetermined cycle (second predetermined time interval) may be the same as the control cycle or may be an integer multiple of the control cycle.

In addition, the predetermined cycle may be a unique sampling cycle that is different from the control cycle. The sampling cycle may be set by the user, for example, for the motor drivers 30b and 30c via the information processing device 10. In addition, the motor drivers 30b and 30c may own sampling cycles uniquely.

The operation information 42 stored in the storage part 55 is in the ring buffer format, and in a case in which there is a predetermined number of pieces of operation data, the oldest operation data is overwritten by the latest operation data. In addition, the second predetermined time interval may be the same as the first predetermined time interval or different from the first predetermined time interval.

If the trigger reception part 50 receives the trigger notification including the master trigger time t1 from the trigger notification part 36 of the motor driver 30a, the trigger reception part 50 acquires the time at which the trigger reception part 50 receives the trigger notification, from the time measurement part 45.

The trigger reception part 50 takes the time acquired from the time measurement part 45 as a slave trigger time t2 and causes the storage part 55 to store the master trigger time t1 and the slave trigger time t2. Then, the trigger reception part 50 outputs a trace result information generation instruction to the trace result information generation part 51.

Figure 2:
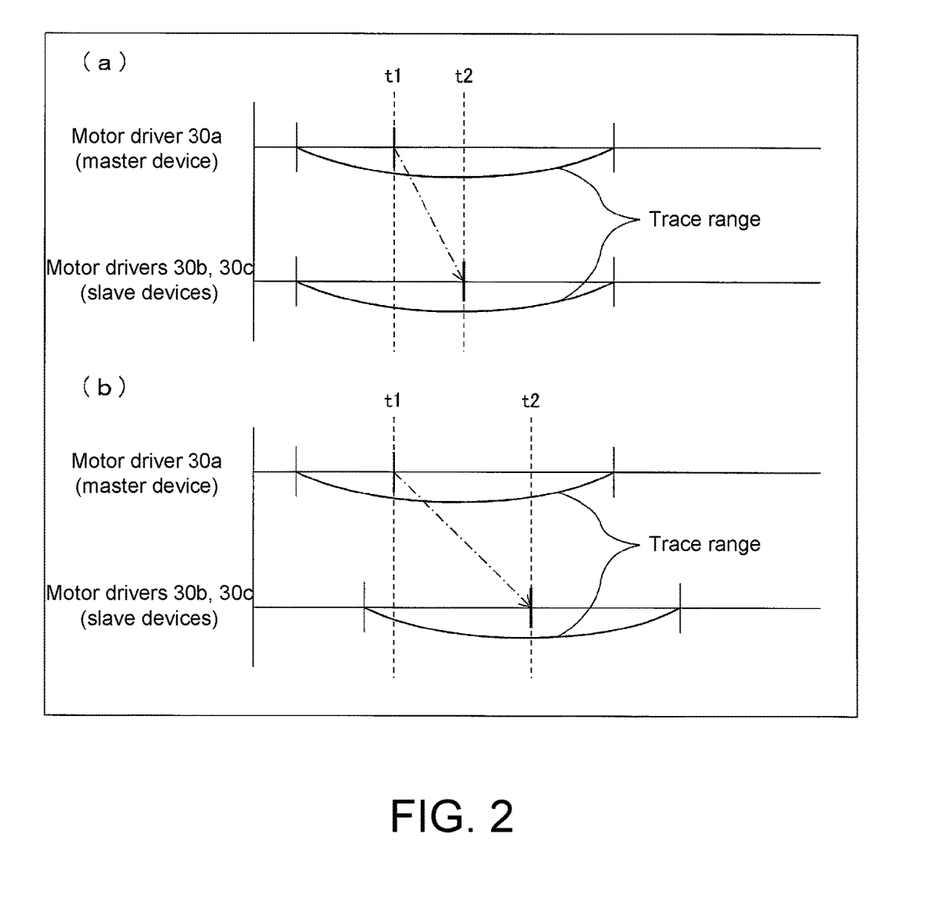
FIG. 2 is an explanatory diagram illustrating operations of a trace result information generation part that is provided in a motor driver of the motor control system illustrated in FIG. 1.

FIG. 2 is an explanatory diagram illustrating operations of the trace result information generation part 51.

If the trace result information generation part 51 receives the trace result information generation instruction from the trigger reception part 50, the trace result information generation part 51 refers to the master trigger time t1, the slave trigger time t2, and the trace range information 41 stored in the storage part 55.

The trace result information generation part 51 specifies which data in the operation information 42 is the operation data at the master trigger time t1 based on a difference between the master trigger time t1 and the slave trigger time t2 received from the trigger reception part 50 and the control cycle (second predetermined time interval) at which the motor drivers 30b and 30c acquire the operation data.

Then, the trace result information generation part 51 associates and stores an operation data group (second operation data group) of the motors 60b and 60c in the trace range indicated by the trace range information 41 with the slave trigger time t2 as the trace result information 43 in the storage part 55 based on the trace range information 41 stored in the storage part 55 ((a) in FIG. 2).

The trace result information 43 stored in the storage part 55 includes a trigger data number (second specification information) indicating which operation data in the operation data group in the trace range is the operation data at the slave trigger time t2.

Then, the trace result information generation part 51 reads the trace result information 43 stored in the storage part 55 and transmits the trace result information 43 to the information processing device 10 via the communication part 46 and the higher-level device 20.

In this manner, the motor drivers 30b and 30c that are the slave devices generate the trace result information 43 by using, as a trigger, the event that trigger reception part 50 acquires the trigger notification including the master trigger time t1 from the trigger notification part 36 of the motor driver 30a that is the master device.

Here, as illustrated in (b) in FIG. 2, the difference between the master trigger time t1 and the slave trigger time t2, that is, the time until the notification indicating that the trigger condition is satisfied is provided to the motor drivers 30b and 30c after the trigger condition is satisfied in the motor driver 30a may be long, and the operation data in the trace range indicated by the trace range information 41 may have been already overwritten at the slave trigger time t2.

In other words, the number of pieces of data of the operation information 42 before the master trigger time t1, which is stored in the storage part 55, may be smaller than the pre-trigger data number at the slave trigger time t2.

In such a case, the trace result information generation part 51 acquires operation data, the number of which is equal to the sum of the pre-trigger data number and the post-trigger data number, from the oldest operation data in the operation information 42 stored in the storage part 55 at the slave trigger time t2.

Then, the trace result information generation part 51 may calculate a trigger data number indicating what number the operation data at the slave trigger time t2 is in the acquired operation data group and generate the trace result information 43 including the operation data group, the slave trigger time t2, and the trigger data number.

[Configuration of Information Processing Device 10]

The information processing device 10 is a personal computer (PC), for example, and includes a display part 11, an input part 12, a storage part 13, and a control part 14.

The input part 12 is a device, such as a mouse or a keyboard, which receives input made by the user.

The display part 11 is a display device such as a liquid crystal display and displays images output from the control part 14.

The storage part 13 stores data acquired from the motor drivers 30 via the higher-level device 20.

The control part 14 includes a trace starting instruction part 15, a trigger condition setting part 16, a trace range setting part 17, a trace result acquisition part 18, and a graph drawing part 19.

The trace starting instruction part 15 transmits a trace starting instruction that is an instruction for starting acquisition of operation data for the respective motor drivers 30 based on an input made by the user.

The trace starting instruction part 15 may transmit the trace starting instruction to the motor drivers 30b and 30c that are the slave devices first and then transmit the trace starting instruction to the motor driver 30a that is the master device when the trace starting instruction part 15 transmits the trace starting instruction.

This is because, if the trace starting instruction is transmitted to all the motor drivers 30 at the same time or if the trace starting instruction is transmitted to the motor driver 30a that is the master device first, the trigger determination part 34 may determine that the trigger condition has been satisfied before a sufficient amount of operation data is accumulated on the operation information 42 in the storage parts 55 of the motor drivers 30b and 30c, and sufficient trace result information 43 may not be obtained.

The trace starting instruction may be provided to the respective motor drivers 30 at the same timing, or the trace starting instruction to the master device may be provided earlier than the trace starting instruction to the slave devices.

The trigger condition setting part 16 generates the trigger condition information 40 indicating the trigger condition based on an input to the input part 12 made by the user.

The trigger condition setting part 16 transmits the trigger condition information 40 to the motor driver 30a when the trace starting instruction part 15 transmits the trace starting instruction to the motor drivers 30.

The trigger condition setting part 16 may not necessarily transmit the trigger condition information 40 at the same time as the trace starting instruction and may transmit the trigger condition information 40 before the trace starting instruction.

The motor driver 30a stores the received trigger condition information 40 in the storage part 39.

The trace range setting part 17 sets the trace range information 41 indicating the trace range based on an input to the input part 12 made by the user. Specifically, the user inputs (1) a total trace time indicating a period of time during which the operation data is stored and (2) a post-trigger data ratio, which indicates a proportion at which the time after the master trigger time t1 occupies the total trace time.

The trigger condition setting part 16 calculates the pre-trigger data number, which is the number of pieces of data before the master trigger time t1, and the post-trigger data number, which is the number of pieces of data after the master trigger time t1, based on the input total trace time, the post-trigger data ratio, and the intervals at which the operation data of the motors 60 is stored (the first predetermined time interval and the second predetermined time interval), as the trace range information 41.

The trace range setting part 17 transmits the trace range information 41 to the motor drivers 30 (30a, 30b, 30c) when the trace starting instruction part 15 transmits the trace starting instruction to the motor drivers 30.

The trace range setting part 17 may not necessarily transmit the trace range information 41 at the same time as the trace starting instruction and may transmit the trace range information 41 before the trace starting instruction.

The motor drivers 30 store the received trace range information 41 in the storage parts 39 and 55.

The trace result acquisition part 18 acquires the trace result information 43 from the storage part 39 of the motor driver 30a and the storage parts 55 of the motor drivers 30b and 30c and stores the trace result information 43 in the storage part 13.

The graph drawing part 19 reads the trace result information 43 from the storage part 13 and presents, as a graph, the operation data included in each trace result information 43 in the same time axis coordinates based on the trigger data number, the master trigger time t1, and the slave trigger time t2 included in the trace result information 43.

Specifically, the motor drivers 30 acquire the operation data from the motors 60 at predetermined cycles (the first predetermined time interval, the second predetermined time interval). Therefore, the graph drawing part 19 can distinguish which operation data is the operation data at the master trigger time t1 based on the cycle at which the operation data is acquired (second predetermined time interval), the master trigger time t1, and the slave trigger time t2 if which operation data in the trace result information 43 acquired from the motor drivers 30b and 30c that are the slave devices is the operation data at the slave trigger time t2 is known.

In this manner, the graph drawing part 19 specifies which operation data is the data at the master trigger time t1 in the operation data group included in the operation information 42 that is acquired from the motor drivers 30b and 30c that are the slave devices.

Then, the graph drawing part 19 generates a graph of the operation data group that is included in the operation information 42 acquired from the motor driver 30a that is the master device and the operation data group that is included in the operation information 42 acquired from the motor drivers 30b and 30c that are the slave devices and outputs the graph to the display part 11.

Figure 3:
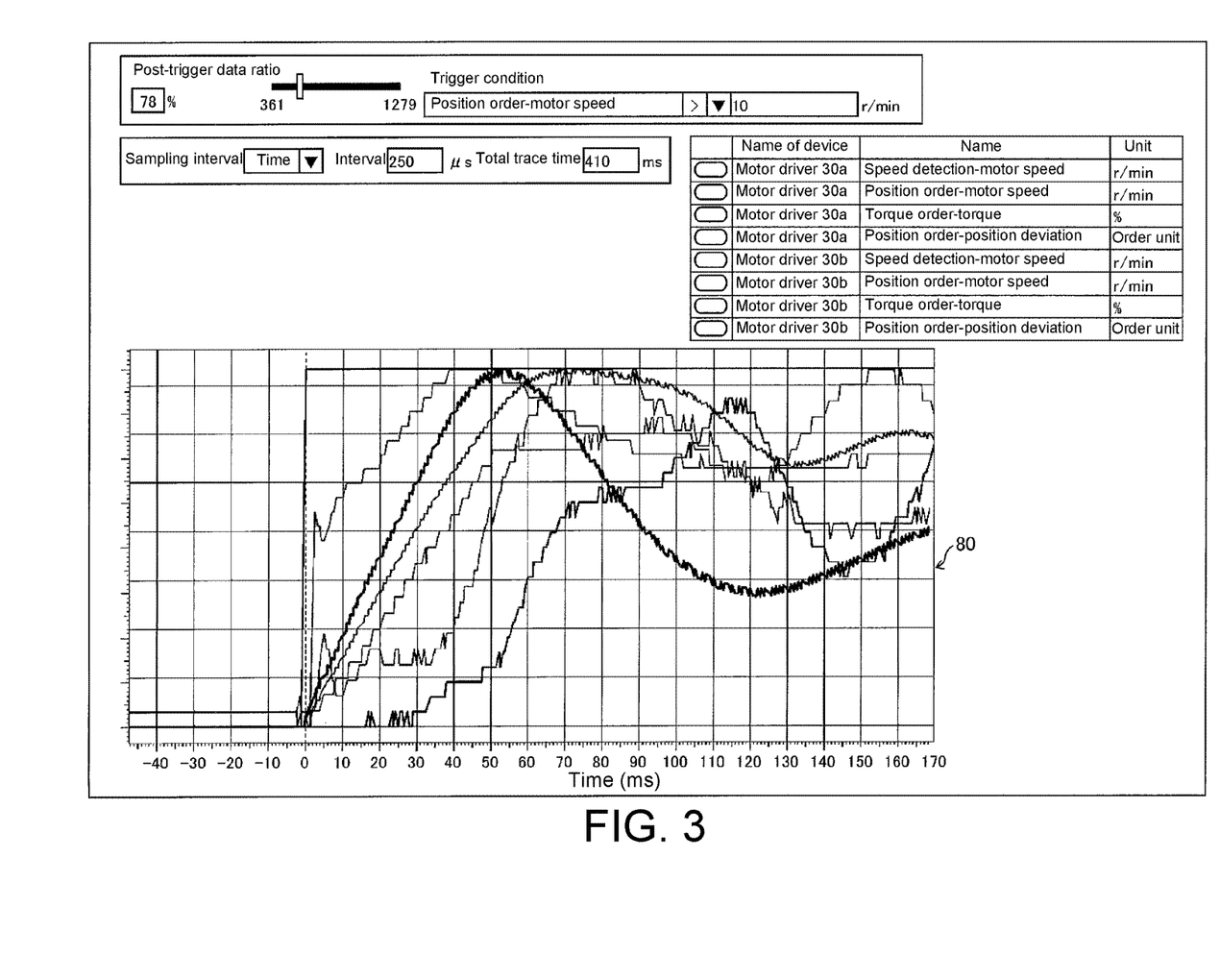
FIG. 3 is a diagram illustrating an example of a screen that is displayed on a display part provided in an information processing device of the motor control system illustrated in FIG. 1.

FIG. 3 is a diagram illustrating an example of a screen that is displayed on the display part 11. As illustrated in FIG. 3, the graph drawing part 19 generates a graph 80, which indicates temporal changes in the ordered values and the actually measured values of the respective motors 60, in which the horizontal axis represents a time, and the vertical axis represents the ordered value or the actually measured value indicated by the operation data.

The graph 80 is depicted such that the master trigger time t1 corresponds to 0 ms. The user can ascertain mutual relationships among the operations of the respective motors 60 based on the graph 80 displayed on the display part 11.

As illustrated in FIG. 3, a sampling interval, a total trace time, a post-trigger data ratio, and a trigger condition are displayed on the display part 11 in addition to the graph 80 generated by the graph drawing part 19.

Here, the sampling interval is a cycle (the aforementioned first predetermined time interval, the second predetermined time interval) at which the motor drivers 30 acquire the operation information from the motors 60.

Although the cycles at which the operation information is acquired for all the motors 60 are the same in the example illustrated in FIG. 3, the cycles at which the operation information is acquired from the motors 60 may be different from each other for the respective motors 60.

In the example illustrated in FIG. 3, the sampling interval is 250 μs while the total trace time is 410 μs. Therefore, the trace result information 43 includes 1641 pieces of data. In addition, since the post-trigger data ratio is 78%, it is understood that the trace result information 43 includes 361 pieces of data before the master trigger time t1 and 1279 pieces of data after the master trigger time t1.

Although the graph drawing part 19 is configured to display the generated graph on the display part 11 in the embodiment, in addition to or instead of this configuration, the graph drawing part 19 may output the generated graph to another information processing device or may perform processing of printing the generated graph and outputting the graph as a paper medium.

[Flow of Graph Display Processing]

Next, a flow of graph display processing in the motor control system 100 will be described with reference to FIG. 4.

Figure 4:
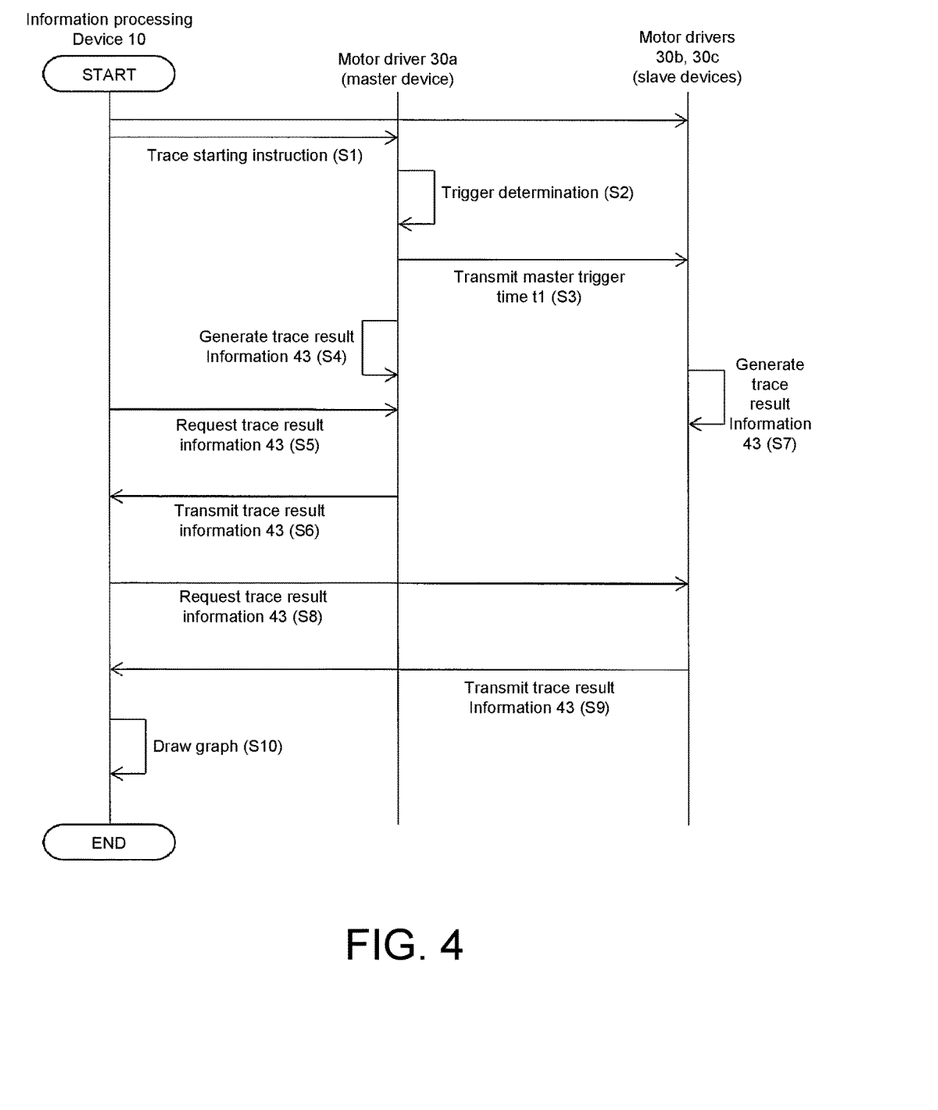
FIG. 4 is a flowchart illustrating a flow of graph display processing in the motor control system according to an embodiment of the disclosure.

FIG. 4 is a flowchart illustrating a flow of graph display processing in the motor control system 100.

First, the trace starting instruction part 15 of the information processing device 10 transmits the trace starting instruction to the motor drivers 30 (S1). At this time, the information processing device 10 transmits the trigger condition information 40 and the trace range information 41 in addition to the trace starting instruction to the motor driver 30a that is the master device. In addition, the information processing device 10 transmits the trace range information 41 in addition to the trace starting instruction to the motor drivers 30b and 30c that are the slave devices.

When the motor drivers 30 receive the trace starting instruction from the information processing device 10, the detection part 48 starts the generation of the operation information 42. Then, the trigger determination part 34 of the motor driver 30a compares the trigger condition with the latest operation data in the operation information 42 in the motor 60a every time the operation information 42 in the storage part 39 is updated, and determines whether or not the trigger condition is satisfied (S2).

If the trigger determination part 34 of the motor driver 30a determines that the trigger condition is satisfied, the trigger notification part 36 acquires the time at which the trigger condition is satisfied from the time measurement part 45, takes the acquired time as the master trigger time t1, and transmits the trigger notification including the master trigger time t1 to the motor drivers 30b and 30c that are the slave devices (S3).

In addition, if the trigger determination part 34 of the motor driver 30a determines that the trigger condition is satisfied, then the trigger result information generation part 35 refers to the trace range information 41 saved in the storage part 39 and starts generation of the trace result information 43 (S4).

The trace result information generation part 35 acquires the operation data before the master trigger time t1 by the number of pieces of data indicated by the trace range information 41 from the operation information 42 in the storage part 39.

Next, the trace result information generation part 35 calculates the trigger data number indicating the number of the data at the beginning of the operation data, as the first specification information for specifying the operation data at the master trigger time t1.

Then, when the operation data after the master trigger time t1 is written in the operation information 42, the trace result information generation part 35 reads the operation data from the operation information 42 by the number of pieces of data indicated by the trace range information 41. The trace result information generation part 35 stores the trace result information 43 including the respective operation data (the respective operation data is arranged in the order in which the operation data is generated) in the read trace range, the master trigger time t1, and the trigger data number in the storage part 39.

Thereafter, when the trace result information generation part 35 receives a request for transmitting the trace result information 43 from the information processing device 10 (S5), the trace result information generation part 35 transmits the trace result information 43 stored in the storage part 39 to the information processing device 10 (S6).

When the motor drivers 30b and 30c receive the trigger notification including the master trigger time t1 from the motor driver 30a, the motor drivers 30b and 30c starts generation of the trace result information 43 (S7).

Specifically, when the trigger reception part 50 receives the trigger notification from the motor driver 30a, the trigger reception part 50 acquires the slave trigger time t2 that is a time at which the motor drivers 30b and 30c receive the trigger notification from the time measurement part 45 and causes the storage part 55 to store the master trigger time t1 and the slave trigger time t2.

When the trace result information generation part 51 receives the trace result information generation instruction from the trigger reception part 50, the trace result information generation part 51 refers to the master trigger time t1, the slave trigger time t2, and the trace range information 41 that are stored in the storage part 55 and reads the operation data in the trace range. At this time, the trace result information generation part 51 specifies the trigger data number indicating the number of the data at the beginning of the operation data as the second specification information for specifying the operation data at the slave trigger time t2.

Then, when the collection of the operation data, the number of which is indicated by the trace range information 41, is completed, the trace result information generation part 51 stores the trace result information 43 including the operation data group in the trace range, the slave trigger time t2, and the trigger data number in the storage part 55.

Thereafter, when the trace result information generation part 51 receives a request for transmitting the trace result information 43 from the information processing device 10 (S8), the trace result information generation part 51 transmits the trace result information 43 stored in the storage part 55 to the information processing device 10 (S9).

When the information processing device 10 receives the trace result information 43 from the motor driver 30a and the motor drivers 30b and 30c, the trace result acquisition part 18 stores the trace result information 43 in the storage part 13.

Then, the graph drawing part 19 refers to the trace result information 43 stored in the storage part 13, draws all the operation data groups acquired from the motor drivers 30 as graphs in the same time axis coordinates, and displays the graphs on the display part 11 (S10).

[Comparison with Related Art]

Next, effects of the motor control system 100 according to the embodiment will be described.

In the motor control system used in the related art, the higher-level device 20 transmits an instruction for starting the generation of the trace result information 43 to all the motor drivers 30 by synchronous serial communication. Therefore, the communication cycle of the synchronous serial communication becomes longer in proportion to the command size of the instruction for starting the generation of the trace result information 43.

On the other hand, in the motor control system 100 according to the embodiment, the motor driver 30a that is the master device transmits the instruction for starting the generation of the trace result information 43 to the motor driver 30b that is the slave device by asynchronous communication. Therefore, it is not necessary to elongate the communication cycle of the synchronous serial communication for transmitting the instruction for starting the generation of the trace result information 43.

In addition, in the motor control system 100 according to the embodiment, it is not necessary to perform synchronous communication between the higher-level device 20 and all the motor drivers 30 for the instruction for starting the generation of the trace result information 43 and the processing of collecting the operation data. Therefore, the motor control system 100 according to the embodiment is applicable not only to servo drivers but also to inverters or a motor control system in which servo drivers and inverters are present together.

Further, in the motor control system used in the related art, the higher-level device 20 transmits the instruction for starting the generation of the trace result information 43 to all the motor drivers 30 by synchronous serial communication. Therefore, it is not possible to acquire the operation data of multiple motor drivers 30 when the higher-level device 20 and the motor drivers 30 are not in the state of periodically performing communication.

On the other hand, in the motor control system 100 according to the embodiment, communication is only required between at least the motor driver 30a that is the master device and the information processing device 10 in order to display the trace result information 43 as graphs.

Therefore, in the motor control system 100 according to the embodiment, it is not always necessary to provide the higher-level device 20 to display the trace result information 43 as graphs, which is different from the motor control system used in the related art.

As a result, it is possible to present the trace result information 43 indicating the operation statuses of the respective motors as graphs in the same time axis coordinates by performing synchronous communication between the information processing device 10 and the master device and to ascertain the mutual relationships among the operation statuses of the respective motors even if it is desired to perform preliminary operation of the motor control devices while the higher-level device is not yet ready, for example.

Modification Examples

Next, modification examples of the motor control system 100 according to the embodiment will be described.

In the aforementioned embodiment, the motor driver 30a is set as the master device in advance, and the trigger condition setting part 16 is configured to transmit the trigger condition information 40 to the motor driver 30a that is the master device when the trace starting instruction part 15 transmits the trace starting instruction to the motor drivers 30.

However, another configuration may also be employed, in which a motor driver 30 that is a target of a trigger condition serves as the master device by the user's input of the trigger condition to the information processing device 10.

That is, the configuration may be made such that all the motor drivers 30 each includes the trigger determination part 34, the trigger notification part 36, the trigger reception part 50, and the trace result information generation parts 35 and 51, and a motor driver 30 that receives the trigger condition from the trigger condition setting part 16 serves as the master device while the other motor drivers 30 serve as the slave devices.

In addition, the motor driver 30a that is the master device is configured to transmit the master trigger time t1 to the motor drivers 30b and 30c that are the slave devices in the aforementioned embodiment.

However, the motor driver 30a that is the master device may not transmit the master trigger time t1 if the motor driver 30a transmits the trigger notification indicating that the trigger condition is satisfied to the motor drivers 30b and 30c that are the slave devices by asynchronous communication. In a case in which the motor driver 30a does not transmit the master trigger time t1 to the motor drivers 30b and 30c, information indicating a predetermined range including the slave trigger time (that is, information including the number of pieces of operation data before the slave trigger time t2 and the number of pieces of operation data after the slave trigger time t2) is set as the trace range information 41 in the slave devices.

The predetermined range is set in advance such that the master trigger time is included in consideration of an assumed time difference, which is from the timing when the trigger condition is satisfied to the timing when the slave devices receive the trigger notification, by verifying the time difference by a preliminary experiment or the like.

Then, the motor drivers 30b and 30c take the time at which the trigger notification is received as the slave trigger time and generates the trace result information 43 including the operation data group in the trace range including the slave trigger time and the trigger data number. Then, the information processing device 10 may specify which operation data in the operation data group included in the trace result information 43 is the data at the master trigger time t1 based on the trace result information 43 acquired from the motor driver 30a that is the master device and the trace result information 43 acquired from the motor drivers 30b and 30c that are the slave devices and present the operation data in the same time axis coordinates.

Further, the information processing device 10 is configured to acquire the master trigger time t1 by the trace result information 43 acquired from the motor driver 30a in the aforementioned embodiment.

That is, although the information processing device 10 is configured to acquire the master trigger time t1 from the motor driver 30a that is the master device in the aforementioned embodiment, the information processing device 10 may acquire the master trigger time t1 from the motor drivers 30b and 30c that are the slave devices. In such a case, the trace result information generation part 51 of the motor driver 30b may generate the trace result information 43 including the operation data group, the slave trigger time t2, the trigger data number, and the master trigger time t1.

[Example of Implementation by Software]

The control block (the trigger determination part 34, the trigger notification part 36, the trigger reception part 50, and the trace result information generation parts 35 and 51, in particular) of the motor driver 30 may be implemented by a logical circuit (hardware) formed on an integrated circuit (IC chip) or the like or may be implemented by software by a central processing unit (CPU).

In the latter case, the motor driver 30 includes a CPU that executes commands of a program that is software for implementing the respective functions, a read only memory (ROM) or a storage device (these will be referred to as a "recording medium") in which the aforementioned program and various kinds of data are recorded in a computer (or CPU) readable manner, a random access memory (RAM) that develops the aforementioned program, and the like.

In addition, the object of the disclosure is achieved by the computer (or the CPU) reading and executing the program from the recording medium. As the recording medium, a "non-transitory tangible medium" such as a tape, a disk, a card, a semiconductor memory, or a programmable logical circuit, for example, can be used.

In addition, the aforementioned program may be supplied to the aforementioned computer via any transmission medium (a communication network, a broadcasting wave, or the like) that can transmit the program.

The disclosure can also be implemented in the form of data signals that are incorporated in carrier wave, in which the aforementioned program is realized by electronic transmission.

CONCLUSION

As described above, the motor control system according to the disclosure includes: a plurality of motors: and motor control devices that are connected to the motors respectively and control the motors at a predetermined control cycle, wherein one of the motor control devices is a master device while other motor control devices are slave devices. (1) The master device includes a first storage device that stores operation data of the motor connected to the master device at a first predetermined time interval, a trigger determination part that determines whether not the operation data satisfies a predetermined trigger condition, a trigger notification part that transmits a trigger notification that includes a master trigger time that is a time at which the trigger condition is satisfied to the slave devices by asynchronous communication when the trigger determination part determines that the trigger condition is satisfied, and a first result information generation part that causes the first storage device to store first specification information for specifying the operation data when the trigger condition is satisfied, and (2) each of the slave devices includes a second storage device that stores operation data of the motors connected to the slave devices at a second predetermined time interval, and a second result information generation part that causes the second storage device to store second specification information for specifying the operation data when the trigger notification is received, a slave trigger time that is a time at which the trigger notification is received, and the master trigger time that is included in the trigger notification when the trigger notification is received from the trigger notification part.

With the aforementioned configuration, the master device provides the trigger notification to the slave devices by the asynchronous communication and causes the first storage device to store the first specification information for specifying the operation data when the trigger condition is satisfied. Meanwhile, the slave devices cause the second storage device to store the second specification information for specifying the operation data when the trigger notification is received, the slave trigger time that is a time at which the trigger notification is received, and the master trigger time included in the trigger notification by using the event that the trigger notification is received from the master device as a trigger. Therefore, it is possible to specify the operation data corresponding to the master trigger time in the operation data stored in the slave devices based on the difference between the slave trigger time and the master trigger time, the second specification information, and the second predetermined time interval. As a result, it is possible to match the operation data corresponding to the master trigger time in both the operation data group stored in the master device and the operation data groups stored in the slave devices to the same time. In this manner, it is possible to ascertain the mutual relationships among the operation statuses of the motors corresponding to the respective motor control devices without synchronous serial communication for the plurality of motor control devices.

In addition, the motor control system according to the disclosure may include an information processing device. The first result information generation part may read operation data in a predetermined period of time that is set with reference to the master trigger time from the first storage device based on the master trigger time and the first predetermined time interval and output a first operation data group that is the operation data in the predetermined period of time, which has been read, and the first specification information to the information processing device. The second result information generation part may read the operation data in the predetermined period of time that is set with reference to the master trigger time from the second storage device based on the slave trigger time, the master trigger time, and the second predetermined time interval and output a second operation data group that is the operation data in the predetermined period of time, which has been read, the second specification information, and the slave trigger time to the information processing device, and the first result information generation part or the second result information generation part may output the master trigger time to the information processing device.

With the aforementioned configuration, the information processing device can collectively manage the first operation data group of the master device and the second operation data groups of the slave devices.

In addition, in the motor control system according to the disclosure, the information processing device may specify the operation data corresponding to the master trigger time in the second operation data group based on a time difference between the slave trigger time and the master trigger time, the second predetermined time interval, and the second specification information and output a graph of the first operation data group and the second operation data group such that the operation data that has been specified and the operation data specified by the first specification information are presented in the same time axis coordinates.

With the aforementioned configuration, it is possible to ascertain the graphs of the first operation data group stored in the master device and the second operation data groups stored in the slave devices indicated by the same time axis. In this manner, it is possible to easily recognize the mutual relationships between the motor corresponding to the master device and the motors corresponding to the slave devices.

In addition, as described above, the motor control system according to the disclosure includes a plurality of motors; and motor control devices that are connected to the motors respectively and control the motors at a predetermined control cycle, wherein one of the motor control devices is a master device while other motor control devices are slave devices. (1) The master device includes a first storage device that stores operation data of the motor connected to the master device, a trigger determination part that determines whether not a predetermined trigger condition is satisfied, a trigger notification part that transmits a trigger notification indicating that the trigger condition is satisfied to the slave devices by asynchronous communication when the trigger determination part determines that the trigger condition is satisfied, and a first result information generation part that causes the first storage device to store first specification information for specifying the operation data when the trigger condition is satisfied and a master trigger time that is a time at which the trigger condition is satisfied, and (2) each of the slave devices includes a second storage device that stores operation data of the motors connected to the slave devices, and a second result information generation part that causes the second storage part to store second specification information for specifying the operation data when the trigger notification is received and a slave trigger time that is a time at which the trigger notification is received when the trigger notification is received from the trigger notification part.

With the aforementioned configuration, the master device provides the trigger notification to the slave devices by asynchronous communication and causes the first storage device to store the first specification information for specifying the operation data when the trigger condition is satisfied and the master trigger time that is a time at which the trigger condition is satisfied. Meanwhile, the slave devices cause the second storage devices to store the second specification information for specifying the operation data when the trigger notification is received and the slave trigger time at which the trigger notification is received by using the event that the trigger notification is received from the master device as the trigger. Therefore, it is possible to read various kinds of information stored in the first storage device and the second storage devices and to specify the operation data corresponding to the master trigger time in the operation data stored in the slave devices based on the difference between the slave trigger time and the master trigger time, the second specification information, and the second predetermined time interval. As a result, it is possible to match the operation data corresponding to the master trigger time in both the operation data group stored in the master device and the operation data groups stored in the slave devices to the same time. In this manner, it is possible to ascertain the mutual relationships among the operation statuses of the motors corresponding to the respective motor control devices without synchronous serial communication for the plurality of motor control devices.

In addition, in order to solve the aforementioned problems, the motor control device according to the disclosure is provided in the aforementioned motor control system, and the motor control device is the master device.

In addition, in order to solve the aforementioned problems, the motor control device according to the disclosure is provided in the aforementioned motor control system, and the motor control device is the slave device.

The aforementioned motor control device may be implemented by a computer, and in this case, a program that causes the computer to implement the motor control device by causing the computer to operate as the aforementioned respective parts and a computer-readable recording medium that records the program therein are also within the scope of the disclosure.

The disclosure is not limited to the embodiments as described above, various modifications can be made within the scope indicated by the claims, and embodiments that are obtained by appropriately combining technical means respectively disclosed in different embodiments are also included in the technical scope of the disclosure.

What is claimed is:

1. A motor control system comprising:
    a plurality of motors; and
    motor control devices that are connected to the motors respectively and control the motors at a predetermined control cycle,
    wherein one of the motor control devices is a master device while other motor control devices are slave devices,
    the master device includes:
        a first storage device that stores operation data of the motor connected to the master device at a first predetermined time interval;
        a trigger determination part that determines whether or not the operation data satisfies a predetermined trigger condition;
        a trigger notification part that transmits a trigger notification that includes a master trigger time that is a time at which the trigger condition is satisfied to the slave devices by asynchronous communication when the trigger determination part determines that the trigger condition is satisfied; and
        a first result information generation part that causes the first storage device to store first specification information for specifying the operation data when the trigger condition is satisfied, and
    each of the slave devices includes:
        a second storage device that stores operation data of the motors connected to the slave devices at a second predetermined time interval; and
        a second result information generation part that causes the second storage device to store second specification information for specifying the operation data when the trigger notification is received, a slave trigger time that is a time at which the trigger notification is received, and the master trigger time that is included in the trigger notification when the trigger notification is received from the trigger notification part.

2. The motor control system according to claim 1, comprising:
    an information processing device,
    wherein the first result information generation part reads the operation data in a predetermined period of time that is set with reference to the master trigger time from the first storage device based on the master trigger time and the first predetermined time interval and outputs a first operation data group that is the operation data in the predetermined period of time, which has been read, and the first specification information to the information processing device,
    the second result information generation part reads the operation data in the predetermined period of time that is set with reference to the master trigger time from the second storage device based on the slave trigger time, the master trigger time, and the second predetermined time interval and outputs a second operation data group that is the operation data in the predetermined period of time, which has been read, the second specification information, and the slave trigger time to the information processing device, and
    the first result information generation part or the second result information generation part outputs the master trigger time to the information processing device.

3. The motor control system according to claim 2, wherein the information processing device specifies the operation data corresponding to the master trigger time in the second operation data group based on a time difference between the slave trigger time and the master trigger time, the second predetermined time interval, and the second specification information and outputs a graph of the first operation data group and the second operation data group such that the operation data that has been specified and the operation data specified by the first specification information are presented in the same time axis coordinates.

4. A motor control device that is provided in the motor control system according to claim 1, wherein the motor control device is the master device.

5. A non-transitory recording medium recording a motor control program that causes a computer to function as the motor control device according to claim 4, wherein the motor control program causes the computer to function as each part of the motor control device.

6. A motor control device that is provided in the motor control system according to claim 1, wherein the motor control device is the slave device.

7. A non-transitory recording medium recording a motor control program that causes a computer to function as the motor control device according to claim 6, wherein the motor control program causes the computer to function as each part of the motor control device.

8. A motor control system comprising:
a plurality of motors; and
motor control devices that are connected to the motors respectively and control the motors at a predetermined control cycle,
wherein one of the motor control devices is a master device while other motor control devices are slave devices,
the master device includes:
   a first storage device that stores operation data of the motor connected to the master device;
   a trigger determination part that determines whether or not a predetermined trigger condition is satisfied;
   a trigger notification part that transmits a trigger notification indicating that the trigger condition is satisfied to the slave devices by asynchronous communication when the trigger determination part determines that the trigger condition is satisfied; and
   a first result information generation part that causes the first storage device to store first specification information for specifying the operation data when the trigger condition is satisfied and a master trigger time that is a time at which the trigger condition is satisfied, and
each of the slave devices includes:
   a second storage device that stores operation data of the motors connected to the slave devices; and
   a second result information generation part that causes the second storage device to store second specification information for specifying the operation data when the trigger notification is received and a slave trigger time that is a time at which the trigger notification is received when the trigger notification is received from the trigger notification part.

9. A motor control device that is provided in the motor control system according to claim 8, wherein the motor control device is the master device.

10. A non-transitory recording medium recording a motor control program that causes a computer to function as the motor control device according to claim 9, wherein the motor control program causes the computer to function as each part of the motor control device.

11. A motor control device that is provided in the motor control system according to claim 8, wherein the motor control device is the slave device.

12. A non-transitory recording medium recording a motor control program that causes a computer to function as the motor control device according to claim 11, wherein the motor control program causes the computer to function as each part of the motor control device.

* * * * *